(12) United States Patent
Igarashi et al.

(10) Patent No.: US 8,846,809 B2
(45) Date of Patent: Sep. 30, 2014

(54) URETHANE ADHESIVE COMPOSITION

(75) Inventors: Yoshinori Igarashi, Yokkaichi (JP); Koichiro Higasa, Yokkaichi (JP)

(73) Assignee: Emulsion Technology Co., Ltd., Yokkaichi-shi (JP)

( * ) Notice: Subject to any disclaimer, the term of this patent is extended or adjusted under 35 U.S.C. 154(b) by 601 days.

(21) Appl. No.: 12/681,109

(22) PCT Filed: Sep. 10, 2008

(86) PCT No.: PCT/JP2008/066339
§ 371 (c)(1),
(2), (4) Date: Apr. 1, 2010

(87) PCT Pub. No.: WO2009/047962
PCT Pub. Date: Apr. 16, 2009

(65) Prior Publication Data
US 2010/0292384 A1 Nov. 18, 2010

(30) Foreign Application Priority Data
Oct. 12, 2007 (JP) .................. 2007-266137

(51) Int. Cl.
| | | |
|---|---|---|
| *C08G 18/08* | (2006.01) | |
| *C08L 75/00* | (2006.01) | |
| *C08K 5/34* | (2006.01) | |
| *C08K 5/3477* | (2006.01) | |
| *C07C 261/00* | (2006.01) | |
| *C07C 269/00* | (2006.01) | |
| *C07C 249/00* | (2006.01) | |
| *C07C 251/00* | (2006.01) | |
| *C07C 257/00* | (2006.01) | |
| *C07C 265/00* | (2006.01) | |
| *C09K 3/00* | (2006.01) | |
| *C08G 18/00* | (2006.01) | |
| *C08G 18/10* | (2006.01) | |
| *C08G 18/16* | (2006.01) | |
| *C08G 18/70* | (2006.01) | |
| *C09J 175/04* | (2006.01) | |
| *C08G 18/48* | (2006.01) | |
| *C09J 175/08* | (2006.01) | |
| *C08G 18/76* | (2006.01) | |
| *C08G 18/79* | (2006.01) | |
| *C08K 3/00* | (2006.01) | |
| *C08K 3/26* | (2006.01) | |

(52) U.S. Cl.
CPC .......... *C08G 18/0885* (2013.01); *C08K 3/0033* (2013.01); *C09J 175/04* (2013.01); *C08G 18/10* (2013.01); *C08G 18/4833* (2013.01); *C09J 175/08* (2013.01); *C08G 18/7664* (2013.01); *C08G 18/797* (2013.01); *C08K 3/26* (2013.01); *C08G 18/4808* (2013.01)
USPC ... 524/589; 524/101; 252/182.2; 252/182.21; 252/182.23; 560/25; 560/26; 560/351; 560/158; 560/115; 156/330.9; 156/331.1; 156/331.4; 156/331.7; 528/48; 528/59; 528/65; 528/66; 528/67; 528/85

(58) Field of Classification Search
USPC ............. 252/182.2, 182.21, 182.23; 524/101, 524/589; 560/25, 26, 351, 158, 115; 156/330.9, 331.1, 331.4, 331.7; 528/48, 59, 67, 85, 65, 66
See application file for complete search history.

(56) References Cited

U.S. PATENT DOCUMENTS

| | | | |
|---|---|---|---|
| 4,058,586 A | * | 11/1977 | Chi et al. ...................... 423/712 |
| 4,876,308 A | | 10/1989 | Melby et al. |
| 5,002,806 A | | 3/1991 | Chung |
| 5,164,473 A | | 11/1992 | Dormish et al. |
| 5,175,228 A | | 12/1992 | Wang et al. |
| 5,204,439 A | | 4/1993 | Dormish et al. |
| 5,340,901 A | | 8/1994 | Wang |
| 5,354,609 A | | 10/1994 | Wang |
| 5,614,575 A | * | 3/1997 | Kotschwar ..................... 524/270 |
| 5,955,199 A | | 9/1999 | Johnson et al. |

(Continued)

FOREIGN PATENT DOCUMENTS

| | | | | |
|---|---|---|---|---|
| CA | 1202744 | * | 4/1986 | ............. C08G 18/65 |
| EP | 0699698 | * | 3/1996 | ............. C08G 18/63 |

(Continued)

OTHER PUBLICATIONS

Bayer MDI Product Data Oct. 1998 edition {http://www.pur.bayer.com/BMS/PUR-Internet.nsf/files/foams_elastomers/$file/4914143_e.pdf}.*

(Continued)

*Primary Examiner* — Patrick Ryan
*Assistant Examiner* — Aaron Greso
(74) *Attorney, Agent, or Firm* — Oblon, Spivak, McClelland, Maier & Neustadt, L.L.P.

(57) ABSTRACT

A urethane adhesive composition includes a first liquid and a second liquid, the first liquid containing a prepolymer obtained by reacting a polyisocyanate and a high-molecular-weight polyol (I), and at least one filler selected from talc and calcium carbonate, and containing 20 parts by mass or more of talc, 0 to 40 parts by mass of calcium carbonate, and 10 parts by mass or more of zeolite based on 100 parts by mass of the polyisocyanate, the high-molecular-weight polyol (I), and the prepolymer in total, the second liquid containing a high-molecular-weight polyol (II) and a low-molecular-weight polyol, the ratio of the number of moles of hydroxyl groups derived from the low-molecular-weight polyol to the total number of moles of hydroxyl groups derived from the high-molecular-weight polyol (I) and the high-molecular-weight polyol (II) being four or more.

2 Claims, No Drawings

(56) References Cited

U.S. PATENT DOCUMENTS

| | | | |
|---|---|---|---|
| 6,120,699 A * | 9/2000 | Narayan et al. | 252/182.2 |
| RE37,386 E | 9/2001 | Melby et al. | |
| 2003/0130411 A1 | 7/2003 | Ishikawa et al. | |

FOREIGN PATENT DOCUMENTS

| | | |
|---|---|---|
| JP | 01-132674 | 5/1989 |
| JP | 01-210482 | 8/1989 |
| JP | 04-211485 | 9/1992 |
| JP | 05-247431 | 9/1993 |
| JP | 09-176569 | 7/1997 |
| JP | 2002-030131 | 1/2002 |
| JP | 2003-119373 | 4/2003 |

OTHER PUBLICATIONS

Dow Polyurethanes Definitions Dec. 30, 2010 {https://dow-answer.custhelp.com/app/answers/detail/a_id/13359/~/dow-polyurethanes---functionality,-oh-number,-and-equivalent-weight-definitions}.*

Bayer MDI Product Data Oct. 1998 edition {http://www.pur.bayer.com/BMS/PUR-Internet.nsf/files/foams_elastomers/$file/4914143_e.pdf}.*

U.S. Appl. No. 12/681,109 Remarks Jul. 11, 2012.*

Supplementary European Search Report for corresponding EP Application No. 08837448.3-1214, Dec. 6, 2011.

Japanese Office Action for corresponding JP Application No. 2009-536956, Apr. 16, 2013.

* cited by examiner

URETHANE ADHESIVE COMPOSITION

TECHNICAL FIELD

The present invention relates to a two-part urethane adhesive composition.

BACKGROUND ART

In recent years, a fiber-reinforced plastic material (hereinafter referred to as "FRP material") has been used in various fields (e.g., automobile, construction, and ship). The FRP material is bonded to various materials. A urethane adhesive is normally used for the FRP material.

When bonding a resin material such as the FRP material, the surface of the resin material is generally subjected to a surface treatment (e.g., primer treatment or sanding treatment) in advance. Such a surface treatment improves the adhesive properties, adhesive strength, etc. of the resin material, but increases the number of production steps so that the production efficiency decreases. Therefore, an adhesive that exhibits excellent adhesive properties without applying a primer treatment or a sanding treatment has been desired.

For example, a two-part urethane adhesive composition that contains a first liquid that contains a polyisocyanate and/or a polyisocyanate prepolymer and a second liquid that contains two polyols that differ in number average molecular weight has been proposed (see Patent Document 1, for example).

Patent Document 1: JP-A-1-132674

DISCLOSURE OF THE INVENTION

The urethane adhesive composition disclosed in Patent Document 1 exhibits excellent adhesive properties without applying a primer treatment or a sanding treatment. However, the first liquid may exhibit insufficient storage stability, and the composition may exhibit poor adhesive properties due to addition of additives and the like.

The present invention was conceived in view of the above problems. An object of the present invention is to provide a two-part urethane adhesive composition that ensures that the first liquid exhibits excellent storage stability while maintaining the effects of the composition disclosed in Patent Document 1 (i.e., excellent adhesive properties are achieved without applying a primer treatment or a sanding treatment).

The inventors of the present invention conducted extensive studies in order to achieve the above object. As a result, the inventors found that calcium carbonate added as a filler causes a deterioration in storage stability of the first liquid. The inventors found that the above object can be achieved by utilizing only talc instead of calcium carbonate, or utilizing talc instead of part of the calcium carbonate (i.e., utilizing talc in combination with calcium carbonate) to reduce the content of calcium carbonate to a value equal to or less than a given value. This finding has led to the completion of the present invention. According to the present invention, the following adhesive composition is provided.

[1] A urethane adhesive composition comprising a first liquid that contains a prepolymer obtained by reacting a polyisocyanate and a polyol, and a second liquid that contains a polyol and a catalyst, the first liquid containing a prepolymer obtained by reacting a polyisocyanate and a high-molecular-weight polyol (I) having a number average molecular weight of 1000 or more, and at least one filler selected from talc and calcium carbonate, and containing 20 parts by mass or more of talc, 0 to 40 parts by mass of calcium carbonate, and 10 parts by mass or more of zeolite based on 100 parts by mass of the polyisocyanate, the high-molecular-weight polyol (I), and the prepolymer in total; the second liquid containing a high-molecular-weight polyol (II) having a number average molecular weight of 1000 or more, and a low-molecular-weight polyol having a number average molecular weight of less than 1000; and the ratio of the number of moles of hydroxyl groups derived from the low-molecular-weight polyol to the total number of moles of hydroxyl groups derived from the high-molecular-weight polyol (I) and the high-molecular-weight polyol (II) being four or more.

[2] The urethane adhesive composition according to [1], wherein the prepolymer is obtained by reacting the high-molecular-weight polyol (I) with at least one polyisocyanate selected from polymeric MDI and modified MDI.

The adhesive composition according to the present invention exhibits excellent adhesive properties without applying a primer treatment or a sanding treatment. Moreover, the first liquid that contains an isocyanate component exhibits excellent storage stability.

BEST MODE FOR CARRYING OUT THE INVENTION

Preferred embodiments of the present invention are described below. Note that the present invention is not limited to the following embodiments. It should be understood that various modifications and improvements may be made of the following embodiments without departing from the scope of the present invention based on the knowledge of a person having an ordinary skill in the art.

The term "number average molecular weight" used herein refers to a polystyrene-reduced number average molecular weight measured by gel permeation chromatography (GPC).

[1] Urethane Adhesive Composition

A urethane adhesive composition according to the present invention is a two-part urethane adhesive composition that includes a first liquid that contains a prepolymer obtained by reacting a polyisocyanate and a polyol, and a second liquid that contains a polyol and a catalyst.

[1-1] First Liquid

A first liquid of a two-part urethane adhesive generally refers to a liquid that contains a polyisocyanate component.

[1-1A] Prepolymer

The first liquid of the composition according to the present invention contains a prepolymer as a polyisocyanate component obtained by reacting a polyisocyanate and a high-molecular-weight polyol (I) having a number average molecular weight of 1000 or more (hereinafter may be referred to as "isocyanate-terminated prepolymer"). The polyisocyanate and the high-molecular-weight polyol (I) may be reacted under arbitrary conditions. For example, the polyisocyanate and the high-molecular-weight polyol (I) are reacted at 20 to 90° C. for 1 to 6 hours to obtain a prepolymer.

Since the first liquid is reacted with the second liquid later, the first liquid must contain isocyanate groups of the polyisocyanate in excess with respect to hydroxyl groups of the high-molecular-weight polyol (I). Therefore, the first liquid may contain unreacted polyisocyanate in addition to the prepolymer. The content of the prepolymer in the first liquid is preferably 15 mass % or more based on the total amount as 100 mass % of the polyisocyanate (including "additional polyisocyanate" described later), the high-molecular-weight polyol (I), and the prepolymer. If the content of the prepolymer in the first liquid is 15 mass % or more, part of the polyisocyanate reacts with the high-molecular-weight polyol (I) before mixing the first liquid with the second liquid, so that the reaction time after mixing the first liquid with the second liquid can be reduced. The content of the prepolymer in the first liquid is preferably 70 mass % or less so that the first liquid maintains a low viscosity. The content of the prepolymer is more preferably 15 to 60 mass %, and particularly preferably 20 to 50 mass %, in order to reliably achieve the above effects.

The first liquid is prepared by mixing the polyisocyanate, the high-molecular-weight polyol (I), the filler, and the like, and allowing the polyisocyanate and the high-molecular-weight polyol (I) to react in the mixture to form a prepolymer (first method). Note that a prepolymer obtained by reacting the polyisocyanate and the high-molecular-weight polyol (I) may be as the raw material instead of, or in addition to, the polyisocyanate and the high-molecular-weight polyol (I). Specifically, the first liquid may be prepared by preparing a raw material prepolymer from the polyisocyanate and the high-molecular-weight polyol (I), and mixing the raw material prepolymer with the filler and the like optionally together with the polyisocyanate and the high-molecular-weight polyol (I) (second method).

Note that the total amount of the polyisocyanate, the high-molecular-weight polyol (I), and the prepolymer refers to the total amount of the polyisocyanate and the high-molecular-weight polyol (I) used to form the prepolymer when using the first method, and refers to the total amount of the polyisocyanate, the high-molecular-weight polyol (I), and the prepolymer used to prepare the first liquid when using the second method.

[1-1A(i)] Polyisocyanate

The term "polyisocyanate" refers to a substance that has two or more isocyanate groups in the molecule. The polyisocyanate may be an aliphatic compound, an aromatic compound, or an alicyclic compound insofar as the compound has two or more isocyanate groups in the molecule. It is preferable to use an aromatic compound as the polyisocyanate since the resulting adhesive composition exhibits improved adhesive strength.

Specific examples of the polyisocyanate include diisocyanates such as 4,4'-diphenylmethane diisocyanate (hereinafter may be referred to as "monomeric MDI"), xylylene diisocyanate, polymethylene polyphenyl polyisocyanate (hereinafter may be referred to as "polymeric MDI"), isophorone diisocyanate, tolylene diisocyanate, hexamethylene diisocyanate, naphthalene diisocyanate, hydrogenated diphenylmethane diisocyanate, hydrogenated xylene diisocyanate, and dicyclohexylmethane diisocyanate. A modified product, a polymer, and the like of these compounds may also be used. In the present invention, it is preferable to use the polyisocyanate of at least one polymeric MDI and modified monomeric MDI (hereinafter may be referred to as "modified MDI") for forming prepolymer.

The polyisocyanate preferably has an isocyanate content of 20 to 45 mass %. If the polyisocyanate has an isocyanate content of 20 mass % or more, the rigidity of a cured product obtained by mixing two liquids can be improved. If the polyisocyanate has an isocyanate content of 45 mass % or less, elongation of the cured product can be improved. It is more preferable to use a polyisocyanate having an isocyanate content of 25 to 39 mass %, and particularly preferably 28 to 33 mass %, in order to reliably achieve the above effects.

The average number of isocyanate groups of the polyisocyanate is preferably 2 to 5. If the average number of isocyanate groups of the polyisocyanate is two or more, the mechanical strength of a cured product obtained by mixing two liquids can be improved. If the average number of isocyanate groups of the polyisocyanate is five or less, the flexibility of the cured product can be improved.

[1-1A(ii)] High-molecular-weight Polyol (I)

The term "polyol" refers to a substance that has two or more hydroxyl groups in the molecule.

Examples of the polyol include various polyols such as: polyhydric alcohols such as ethylene glycol, propylene glycol, polypropylene glycol, trimethylolpropane, diethylene glycol, triethylene glycol, hexamethylene glycol, glycerol, 1,3-butylene glycol, 1,4-butanediol, hexanetriol, pentaerythritol, sorbitol, and neopentyl glycol;

a polyether polyol obtained by addition polymerization of the polyhydric alcohol and an alkylene oxide (e.g., ethylene oxide or propylene oxide); a polyester polyol obtained by condensation of the polyhydric alcohol and a polybasic acid (e.g., maleic acid, succinic acid, adipic acid, sebacic acid, tartaric acid, terephthalic acid, or isophthalic acid); a polyester polyol obtained by ring-opening polymerization of a lactone (e.g., ε-caprolactone or γ-valerolactone);

an acrylic polyol obtained by polymerizing a hydroxyl group-containing polymerizable monomer (e.g., hydroxyethyl acrylate, hydroxybutyl acrylate, or trimethylolpropane monoacrylate), or copolymerizing the hydroxyl group-containing polymerizable monomer with a monomer (e.g., acrylic acid, methacrylic acid, styrene, acrylonitrile, or α-methylstyrene) copolymerizable with the hydroxyl group-containing polymerizable monomer; castor oil and derivatives thereof; an epoxy polyol obtained by reacting an epoxy resin that has an epoxy group at each end with monoethanolamine, diethanolamine, or the like.

When producing the composition according to the present invention, a high-molecular-weight polyol having a number average molecular weight of 1000 or more (hereinafter may be referred to as "high-molecular-weight polyol (I)") is used to form the prepolymer. The high-molecular-weight polyol (I) is reacted in advance with the polyisocyanate before the polyisocyanate is reacted with the polyol contained in the second liquid. The high-molecular-weight polyol (I) is added to adjust the viscosity and the NCO content of the first liquid.

If the number average molecular weight of the high-molecular-weight polyol (I) is 1000 or more, the flexibility of a cured product obtained by mixing two liquids can be improved. The upper limit of the number average molecular weight of the high-molecular-weight polyol (I) is not particularly limited insofar as it is 1000 or more, but is preferably 10,000 or less in order to improve the mechanical strength of the cured product. The number average molecular weight of the high-molecular-weight polyol (I) is more preferably 1000 to 8000, and particularly preferably 1000 to 5000, in order to reliably achieve the above effects.

The average number of hydroxyl groups of the high-molecular-weight polyol (I) is preferably 2 to 3. If the average number of hydroxyl groups of the high-molecular-weight polyol (I) is two or more, the mechanical strength of a cured product obtained by mixing two liquids can be improved. If the average number of hydroxyl groups of the high-molecular-weight polyol (I) is three or less, the viscosity of an adhesive (uncured product) obtained by mixing two liquids can be reduced. The average number of hydroxyl groups of the high-molecular-weight polyol (I) is more preferably two in order to reliably achieve the above effects.

The type of polyol is not particularly limited insofar as the polyol has a number average molecular weight within the above range, but a polyether polyol is preferably used.

[1-1B] Additional Polyisocyanate

The first liquid used to produce the composition according to the present invention may further contain an additional polyisocyanate component insofar as the first liquid contains the above prepolymer. For example, the first liquid may further contain a polyisocyanate that does not form a prepolymer. Examples of such a polyisocyanate preferably include the polyisocyanates mentioned above in connection with the prepolymer.

The content of the additional polyisocyanate in the first liquid is preferably 35 to 85 mass % based on the total amount as 100 mass % of the polyisocyanate (including the additional polyisocyanate), the high-molecular-weight polyol (I), and the prepolymer. If the content of the additional polyisocyanate in the first liquid is 35 mass % or more, the mechanical strength of a cured product obtained by mixing two liquids can be improved. If the content of the additional polyisocyanate in the first liquid is 85 mass % or less, the flexibility of the cured product can be improved. The content of the additional polyisocyanate in the first liquid is preferably 40 to 80 mass %, in order to reliably achieve the above effects.

[1-1C] Filler

An adhesive composition may contain a filler in order to reduce cost and achieve a reinforcing effect. Example of the filler include a powder and particles formed of an inorganic material such as calcium carbonate, talc, clay, silica, mica, titanium oxide, barium sulfate, zinc oxide, glass balloon, or carbon black. Calcium carbonate that is inexpensive and easily available is normally used as the filler.

In the first liquid of the composition according to the present invention, however, only talc is used instead of calcium carbonate, or talc is used instead of part of the calcium carbonate (i.e., talc is used in combination with calcium carbonate) to reduce the content of calcium carbonate to a value equal to or less than a given value. Specifically, the first liquid of the composition according to the present invention necessarily contains talc as the filler. The amount of calcium carbonate that causes a deterioration in storage stability can be reduced by adding talc so that the storage stability of the first liquid is improved.

The content of talc in the first liquid is 20 parts by mass or more based on the total amount as 100 parts by mass of the polyisocyanate, the high-molecular-weight polyol (I), and the prepolymer. If the content of talc in the first liquid is 20 parts by mass or more, the amount of calcium carbonate can be reduced while achieving a reinforcing effect. The content of talc in the first liquid is preferably 100 parts by mass or less so that the first liquid maintains a low viscosity. The content of talc in the first liquid is more preferably 20 to 60 parts by mass, and particularly preferably 25 to 40 parts by mass, in order to reliably achieve the above effects.

The first liquid may contain calcium carbonate in addition to talc. The content of calcium carbonate in the first liquid is 40 parts by mass or less based on the total amount (=100 parts by mass) of the polyisocyanate, the high-molecular-weight polyol (I), and the prepolymer. If the content of calcium carbonate in the first liquid is 40 parts by mass or less, the storage stability of the first liquid can be improved. The first liquid may also contain a filler other than talc and calcium carbonate.

[1-1D] Dehydrating Agent

The first liquid of the composition according to the present invention contains zeolite. Zeolite removes water contained in the first liquid so that an increase in viscosity of the first liquid due to a reaction between the polyisocyanate and water can be suppressed. Zeolite also suppresses foaming that may occur when curing the two-part urethane adhesive. If foaming occurs to only a small extent during the curing reaction, the curing reaction can be effected at a high temperature, so that the time required to cure the adhesive can be reduced.

As zeolite, nature zeolite or synthetic zeolite may be used. Zeolite may be fired or unfired zeolite. Specific examples of zeolite include zeolites 3A, 4A, 5A, 10X, 13X, and the like. Among these, it is preferable to use zeolite 4A or 5A, and more preferably zeolite 5A due to a high foaming suppression effect. These zeolites may be used either individually or in combination.

The content of zeolite in the first liquid needs to be 10 parts by mass or more based on the total amount as 100 parts by mass of the polyisocyanate, the high-molecular-weight polyol (I), and the prepolymer. If the content of zeolite in the first liquid is 10 parts by mass or more, the storage stability of the first liquid can be improved while achieving a foaming suppression effect. The content of zeolite in the first liquid is preferably 75 parts by mass or less in order to improve the adhesive properties of the adhesive. The content of zeolite in the first liquid is more preferably 15 to 60 parts by mass, and particularly preferably 20 to 35 parts by mass, in order to reliably achieve the above effects.

[1-2] Second Liquid

A second liquid of a two-part urethane adhesive normally contains an active hydrogen compound and a curing catalyst. The second liquid of the composition according to the present invention contains a high-molecular-weight polyol and a low-molecular-weight polyol as active hydrogen compounds.

[1-2A] High-molecular-weight Polyol (II)

A polyol having a number average molecular weight of 1000 or more (hereinafter may be referred to as "high-molecular-weight polyol (II)") is used as the high-molecular-weight polyol. Examples of the high-molecular-weight polyol (II) include the polyols mentioned above in connection with the high-molecular-weight polyol (I).

If the number average molecular weight of the high-molecular-weight polyol (II) is 1000 or more, the flexibility of the cured product can be improved. The upper limit of the number average molecular weight of the high-molecular-weight polyol (II) is not particularly limited insofar as it is 1000 or more, but is preferably 15,000 or less in order to improve the adhesive strength of the adhesive composition. The number average molecular weight of the high-molecular-weight polyol (II) is more preferably 1000 to 8000, and particularly preferably 2500 to 5500, in order to reliably achieve the above effects.

The average number of hydroxyl groups of the high-molecular-weight polyol (II) is preferably 2 to 4. If the average number of hydroxyl groups of the high-molecular-weight polyol (II) is two or more, the cohesive force of the adhesive can be improved. If the average number of hydroxyl groups of the high-molecular-weight polyol (II) is four or less, the flexibility of the cured product can be improved. The average number of hydroxyl groups of the high-molecular-weight polyol (II) is particularly preferably two or three in order to reliably achieve the above effects.

The type of polyol is not particularly limited insofar as the polyol has a number average molecular weight within the above range, but a polyether polyol is preferably used.

The content of the high-molecular-weight polyol (II) in the second liquid is preferably 40 to 70 mass % based on the total amount as 100 mass % of the high-molecular-weight polyol (II) and the low-molecular-weight polyol. If the content of the high-molecular-weight polyol (II) in the second liquid is 40 mass % or more, the cured product can be provided with flexibility. If the content of the high-molecular-weight polyol (II) in the second liquid is 70 mass % or less, the mechanical strength of the cured product can be improved. The content of the high-molecular-weight polyol (II) in the second liquid is preferably 50 to 65 mass % in order to reliably achieve the above effects.

[1-2B] Low-molecular-weight Polyol

A polyol having a number average molecular weight of less than 1000 (hereinafter may be referred to as "low-molecular-weight polyol") is used as the low-molecular-weight polyol.

If the number average molecular weight of the low-molecular-weight polyol is less than 1000, the adhesive properties of the adhesive can be improved. The upper limit of the number average molecular weight of the low-molecular-weight polyol is not particularly limited insofar as it is less than 1000, but is preferably 800 or less in order to improve the adhesive properties of the adhesive. The number average molecular weight of the low-molecular-weight polyol is more preferably 200 to 500, and particularly preferably 250 to 450, in order to reliably achieve the above effects.

The average number of hydroxyl groups of the low-molecular-weight polyol is preferably 2 to 6. If the average number of hydroxyl groups of the low-molecular-weight polyol is two or more, the mechanical strength of the cured product can be improved. If the average number of hydroxyl groups of the low-molecular-weight polyol is six or less, the flexibility of the cured product can be improved. The average number of hydroxyl groups of the low-molecular-weight polyol is more preferably 2 to 4, and particularly preferably two or three, in order to reliably achieve the above effects.

The type of polyol is not particularly limited insofar as the polyol has a number average molecular weight within the above range, but a polyether polyol is preferably used.

The content of the low-molecular-weight polyol in the second liquid is preferably 30 to 60 mass % based on the total amount as 100 mass % of the high-molecular-weight polyol (II) and the low-molecular-weight polyol. If the content of the low-molecular-weight polyol in the second liquid is 30 mass % or more, the mechanical strength of the cured product can be improved. If the content of the low-molecular-weight polyol in the second liquid is 60 mass % or less, the flexibility of the cured product can be improved. The content of the low-molecular-weight polyol in the second liquid is more preferably 35 to 50 mass % in order to reliably achieve the above effects.

[1-2C] Curing Catalyst

The second liquid of the composition according to the present invention contains a curing catalyst. The curing catalyst is not particularly limited insofar as the curing catalyst can promote the reaction between the polyisocyanate and the polyol.

Examples of the curing catalyst include tin carboxylates such as tin acetate, tin octanoate, tin laurate, and tin oleate; dialkyltin carboxylates such as dibutyltin acetate, dibutyltin dilaurate, dibutyltin maleate, dibutyltin di-2-ethyl-hexanoate, dilauryltin diacetate, and dioctyltin diacetate; trialkyltin hydroxides such as trimethyltin hydroxide, tributyltin hydroxide, and trioctyltin hydroxide; dialkyltin oxides such as dibutyltin oxide, dioctyltin oxide, and dilauryltin oxide; dialkyltin chlorides such as dibutyltin dichloride and dioctyltin dichloride;

tertiary amines such as triethylamine, benzyldimethylamine, triethylenediamine, tetramethylbutanediamine, and 2-methyl-triethylenediamine;

1,8-diazabicyclo[5.4.0]undecene-7 (DBU) and organic acid salts of DBU (e.g., phenol salt, stearate, oleate, and formate of DBU); and the like. Among these, the tertiary amines are preferable. The curing catalyst is more preferably triethylenediamine or DBU. These curing catalysts may be used either individually or in combination.

When using two or more curing catalysts in combination, it is preferable to use DBU and triethylenediamine or 2-methyl-triethylenediamine.

The content of the curing catalyst in the second liquid varies depending on the types of catalyst, polyisocyanate, and polyol, but is normally 0.01 to 1.5 parts by mass based on the total amount as 100 parts by mass of the high-molecular-weight polyol (II) and the low-molecular-weight polyol.

[1-2D] Filler

The second liquid may contain a filler in the same manner as the first liquid.

Examples of the filler include the fillers mentioned above in connection with the first liquid. It is preferable to use only talc, or use talc and calcium carbonate in combination. The second liquid may also contain a filler other than talc and calcium carbonate. Examples of such a filler include the fillers mentioned above in connection with the first liquid.

The content of talc in the second liquid is preferably 20 parts by mass or more. If the content of talc in the second liquid is 20 parts by mass or more, the adhesive properties of the adhesive can be improved. The content of talc in the second liquid is preferably 100 parts by mass or less so that the second liquid maintains a low viscosity. The content of talc in the second liquid is more preferably 20 to 70 parts by mass, and particularly preferably 25 to 50 parts by mass, in order to reliably achieve the above effects.

When using talc and calcium carbonate in combination in the second liquid, the content of calcium carbonate is preferably 50 parts by mass or less. If the content of calcium carbonate is 50 parts by mass or less, the adhesive properties of the adhesive can be improved. The content of calcium carbonate is more preferably 40 parts by mass or less, and particularly preferably 35 parts by mass or less, in order to reliably achieve the above effects.

[1-3] Hydroxyl Group Molar Ratio of High-molecular-weight Polyol and Low-molecular-weight Polyol In the composition according to the present invention, the ratio of the number of moles of hydroxyl groups derived from the low-molecular-weight polyol to the total number of moles of hydroxyl groups derived from the high-molecular-weight polyol (I) and the high-molecular-weight polyol (II) is four or more. This ensures that excellent adhesive properties can be obtained without applying a primer treatment or a sanding treatment. The ratio of the number of moles of hydroxyl groups derived from the low-molecular-weight polyol to the total number of moles of hydroxyl groups derived from the high-molecular-weight polyol (I) and the high-molecular-weight polyol (II) is preferably 6 to 7 in order to reliably achieve the above effects.

[1-4] Hydroxyl group/isocyanate Group Molar Ratio

When producing the composition according to the present invention, it is preferable to prepare the first liquid and the second liquid so that the ratio of the number of moles of hydroxyl groups to the number of moles of isocyanate groups (hydroxyl group/isocyanate group molar ratio) is 1.0 to 1.8. If the hydroxyl group/isocyanate group molar ratio is 1.0 or more, the water resistance can be improved. If the hydroxyl group/isocyanate group molar ratio is 1.8 or less, a change in physical properties after initial curing can be suppressed. The hydroxyl group/isocyanate group molar ratio is more preferably 1.0 to 1.5, and particularly preferably 1.05 to 1.3, in order to reliably achieve the above effects.

Note that the isocyanate groups are derived from the polyisocyanate and the like contained in the first liquid, and the hydroxyl groups are derived from the low-molecular-weight polyol, the high-molecular-weight polyol (II), and the like contained in the second liquid.

[1-5] Additives

The first liquid or the second liquid of the composition according to the present invention may contain various additives that are normally used for an adhesive composition. Examples of such additives include a stabilizer, a plasticizer, a coloring agent, and the like.

[2] Method of Producing Urethane Adhesive Composition

The urethane adhesive composition according to the present invention is produced as follows. Specifically, the raw materials are mixed and dispersed at an appropriate temperature (e.g., 5 to 40° C.) using a known mixer (e.g., universal mixer/stirrer) to separately prepare a first liquid and a second liquid. The first liquid and the second liquid are mixed using a commercially available two-part metering/mixing apparatus to obtain an adhesive.

EXAMPLES

The urethane adhesive composition according to the present invention is further described below by way of examples. Note that the present invention is not limited to the following examples. In the examples and comparative examples, "parts" and "%" respectively refer to "parts by mass" and "mass %", unless otherwise indicated. The property value measuring methods and the property evaluation methods are given below.

[1] Raw Material

In the preparation examples, the following raw materials were used.

(1) Polyisocyanate

Polymeric MDI: 4,4'-diphenylmethane diisocyanate polymer ("Sumidur 44V-20" manufactured by Sumika Bayer Urethane Co., Ltd., isocyanate content: 31 mass %)

Modified MDI: modified 4,4'-diphenylmethane diisocyanate carbodiimide ("ISONATE143LJ" manufactured by Dow Chemical Japan Ltd., isocyanate content: 29 mass %)

Hydrogenated XDI: 1,3-bis(isocyanatomethyl)cyclohexane ("Takenate 600" manufactured by Mitsui Chemicals Polyurethanes, Inc., isocyanate content: 43 mass %)

(2) Polyol

Polyol (A): polyether polyol ("Excenol 510" manufactured by Asahi Glass Co., Ltd., number average molecular weight: 4000, average number of hydroxyl groups: 2)

Polyol (B): polyether polyol ("Excenol 2020" manufactured by Asahi Glass Co., Ltd., number average molecular weight: 2000, average number of hydroxyl groups: 2)

Polyol (C): polyether polyol ("Excenol 823" manufactured by Asahi Glass Co., Ltd., number average molecular weight: 5100, average number of hydroxyl groups: 3)

Polyol (D): polyether polyol ("Excenol 3020" manufactured by Asahi Glass Co., Ltd., number average molecular weight: 3200, average number of hydroxyl groups: 2)

Polyol (E): polyether polyol ("Excenol 1020" manufactured by Asahi Glass Co., Ltd., number average molecular weight: 1000, average number of hydroxyl groups: 2)

Polyol (F): polyether polyol ("Excenol 890 MP" manufactured by Asahi Glass Co., Ltd., number average molecular weight: 200, average number of hydroxyl groups: 3)

Polyol (G): polyether polyol ("Uniol TG-330" manufactured by NOF Corporation, number average molecular weight: 300, average number of hydroxyl groups: 3)

Polyol (H): polyether polyol ("Uniol D-400" manufactured by NOF Corporation, number average molecular weight: 400, average number of hydroxyl groups: 2)

Polyol (I): polyether polyol ("Polycerin GP-2000" manufactured by NOF Corporation, number average molecular weight: 500, average number of hydroxyl groups: 4)

Polyol (J): polyether polyol ("Polycerin 18EDA-2000" manufactured by NOF Corporation, number average molecular weight: 500, average number of hydroxyl groups: 4)

(3) Filler

Talc: talc ("Soapstone A" manufactured by Nihon Mistron Co., Ltd., average particle size: 3.5 to 4.0 µm, aspect ratio: 9.5)

Calcium carbonate: calcium carbonate ("NS600" manufactured by Nitto Funka Kogyo K.K., average particle size: 1.5 µm, average aspect ratio: 5 or less)

Silica: silica ("Reolosil QS-102" manufactured by Tokuyama Corporation, surface area: 180 to 220 $m^2/g$)

(4) Dehydrating Agent

Zeolite: 5A synthetic zeolite powder ("Zeostar CA110P" manufactured by Nippon Chemical Industrial Co., Ltd., average particle size: 2 to 4 µm)

(5) Curing Catalyst

Triethylenediamine (manufactured by Air Products Japan, Inc.)

[2] Preparation of First Liquid (Preparation Example A)

47.2 parts by mass of the polymeric MDI and 13.2 parts by mass of the modified MDI were added to 39.6 parts by mass of the polyol (A). The components were reacted at 90° C. for two hours to obtain a prepolymer composition containing a polyisocyanate-terminated prepolymer.

28.3 parts by mass of talc, 28.3 parts by mass of calcium carbonate, and 32.1 parts by mass of zeolite were added to 100 parts by mass of the prepolymer composition to obtain a first liquid having an isocyanate group content of 9.3 mass %. The first liquid thus obtained is referred to as "first liquid (A)".

Preparation Examples B to I

Prepolymer compositions were synthesized in the same manner as in Preparation Example A to obtain first liquids (B) to (I). The details are shown in Table 1.

TABLE 1

|  |  | NCO content | Number average molecular weight | First liquid | | | | |
|---|---|---|---|---|---|---|---|---|
|  |  |  |  | (A) | (B) | (C) | (D) | (E) |
| Polyisocyanate | Polymeric MDI | 31 | — | 47.2 | 47.2 | 80 | 47.2 | 47.2 |
|  | Modified MDI | 29 | — | 13.2 | 13.2 | 0 | 13.2 | 13.2 |
|  | Hydrogenated XDI | 43 | — | 0 | 0 | 0 | 0 | 0 |

TABLE 1-continued

| | | | | | | | | |
|---|---|---|---|---|---|---|---|---|
| High-molecular-weight polyol (I) | Polyol (A) | — | 4000 | 39.6 | 39.6 | 0 | 39.6 | 39.6 |
| | Polyol (B) | — | 2000 | 0 | 0 | 0 | 0 | 0 |
| | Polyol (D) | — | 3200 | 0 | 0 | 12.7 | 0 | 0 |
| | Polyol (E) | — | 1000 | 0 | 0 | 7.3 | 0 | 0 |
| Total (prepolymer composition) | | | | 100 | 100 | 100 | 100 | 100 |
| Filler | Talc | | | 28.3 | 28.3 | 36.4 | 0 | 46.2 |
| | Calcium carbonate | | | 28.3 | 36.8 | 23.6 | 69.8 | 36.8 |
| | Zeolite | | | 32.1 | 23.6 | 21.8 | 18.9 | 5.7 |
| Total (first liquid) | | | | 188.7 | 188.7 | 181.8 | 188.7 | 188.7 |
| High-molecular-weight polyol (I)/polyisocyanate | | | | 0.66 | 0.66 | 0.25 | 0.66 | 0.66 |
| NCO/OH molar ratio of prepolymer composition | | | | 22.2 | 22.2 | 25.8 | 22.2 | 22.2 |
| Talc content (%) | | | | 15 | 15 | 20 | 0 | 24.5 |
| Calcium carbonate content (%) | | | | 15 | 19.5 | 13 | 37 | 19.5 |
| Zeolite content (%) | | | | 17 | 12.5 | 12 | 10 | 3 |
| Prepolymer content (%) in prepolymer composition | | | | 42.3 | 42.3 | 23.6 | 42.3 | 42.3 |
| Filler/prepolymer composition mass ratio | | | | 0.57 | 0.65 | 0.60 | 0.70 | 0.83 |
| NCO content (%) in prepolymer composition | | | | 9.3 | 9.3 | 13.1 | 9.3 | 9.3 |
| Viscosity A (mPa·s) | | | | 35000 | 37000 | 10000 | 25000 | 45000 |
| Viscosity B (mPa·s) | | | | 40000 | 43000 | 12500 | 78000 | 60000 |
| Viscosity B/Viscosity A | | | | 1.1 | 1.2 | 1.3 | 3.1 | 1.3 |
| Storage stability | | | | Good | Good | Good | Bad | Good |

| | | NCO content | Number average molecular weight | First liquid (F) | (G) | (H) | (I) |
|---|---|---|---|---|---|---|---|
| Polyisocyanate | Polymeric MDI | 31 | — | 25 | 15 | 15 | 19.9 |
| | Modified MDI | 29 | — | 28.8 | 30 | 30 | 0 |
| | Hydrogenated XDI | 43 | — | 0 | 0 | 0 | 19.9 |
| High-molecular-weight polyol (I) | Polyol (A) | — | 4000 | 0 | 0 | 0 | 0 |
| | Polyol (B) | — | 2000 | 0 | 55 | 55 | 0 |
| | Polyol (D) | — | 3200 | 0 | 0.0 | 0.0 | 60.2 |
| | Polyol (E) | — | 1000 | 46.2 | 0.0 | 0.0 | 0 |
| Total (prepolymer composition) | | | | 100 | 100 | 100 | 100 |
| Filler | Talc | | | 0 | 25 | 12.5 | 33.7 |
| | Calcium carbonate | | | 0 | 0 | 0 | 0 |
| | Zeolite | | | 25 | 0 | 12.5 | 0 |
| Total (first liquid) | | | | 125 | 125 | 125 | 133.7 |
| High-molecular-weight polyol (I)/polyisocyanate | | | | 0.86 | 1.22 | 1.22 | 1.51 |
| NCO/OH molar ratio of prepolymer composition | | | | 4.2 | 5.8 | 5.8 | 5.8 |
| Talc content (%) | | | | 0 | 20 | 10 | 25.2 |
| Calcium carbonate content (%) | | | | 0 | 0 | 0 | 0 |
| Zeolite content (%) | | | | 20 | 0 | 10 | 0 |
| Prepolymer content (%) in prepolymer composition | | | | 59 | 62.8 | 62.8 | 64.5 |
| Filler/prepolymer composition mass ratio | | | | 0.00 | 0.25 | 0.13 | 0.34 |
| NCO content (%) in prepolymer composition | | | | 9.8 | 8.8 | 8.8 | 9.4 |
| Viscosity A (mPa·s) | | | | 42000 | 35000 | 30000 | 18000 |
| Viscosity B (mPa·s) | | | | 48000 | 45000 | 34000 | 22000 |
| Viscosity B/Viscosity A | | | | 1.1 | 1.3 | 1.1 | 1.2 |
| Storage stability | | | | Good | Good | Good | Good |

Note:
The viscosity A refers to the viscosity immediately after preparation, and the viscosity B refers to the viscosity after storage at 20° C. for 20 days.

[3] Evaluation (Storage Stability) of First Liquid

The storage stability of the first liquids (A) to (I) was evaluated by the following method. 100 ml of the first liquid contained in a cylindrical glass container was heated to 20° C. in warm water, and the viscosity of the first liquid was measured using a Brookfield viscometer (the viscosity thus measured is referred to as "viscosity A"). The first liquid was heated to 40° C., and allowed to stand for 20 days. After 20 days, the viscosity of the first liquid was measured in the same manner as described above (the viscosity thus measured is referred to as "viscosity B").

A case where the ratio of the viscosity B to the viscosity A (viscosity B/viscosity A) was 1.3 or less was evaluated as "Good", a case where the ratio of the viscosity B to the viscosity A (viscosity B/viscosity A) was more than 1.3 and 2 or less was evaluated as "Fair", and a case where the ratio of the viscosity B to the viscosity A (viscosity B/viscosity A) was more than 2 was evaluated as "Bad".

The first liquids (A) to (C), (E), (G), and (I) in which the content of talc and calcium carbonate was within the ranges of the present invention exhibited excellent storage stability. On the other hand, the first liquid (D) that did not contain talc and had a calcium carbonate content of more than 40 parts by mass exhibited poor storage stability. Similarly, first liquids (F) and (H) are outside the range of the present invention.

[4] Preparation of Second Liquid (Preparation Example V)

28.6 parts by mass of the polyol (C), 28.6 parts by mass of the polyol (D), 28.6 parts by mass of the polyol (G), 14.2 parts by mass of the polyol (H), and 42.6 parts by mass of talc were mixed, and dehydrated at 120° C. under reduced pressure. After the addition of 0.29 parts by mass of the curing catalyst, the components were mixed to obtain a second liquid (V).

Preparation Examples W to Z

Second liquids (W) to (Z) were prepared in the same manner as in Preparation Example V. The details are shown in Table 2.

TABLE 2

| | | Number average molecular weight | Average number of hydroxyl groups | Second liquid (V) | (W) | (X) | (Y) | (Z) |
|---|---|---|---|---|---|---|---|---|
| High-molecular-weight polyol (II) | Polyol (C) | 5100 | 3 | 28.6 | 61.7 | 66.7 | 0 | 87.6 |
| | Polyol (D) | 3200 | 2 | 28.6 | 0 | 0 | 0 | 0 |
| Low-molecular-weight polyol | Polyol (F) | 200 | 3 | 0 | 0 | 0 | 0 | 0 |
| | Polyol (G) | 300 | 3 | 28.6 | 38.3 | 33.3 | 0 | 12.4 |
| | Polyol (H) | 400 | 2 | 14.2 | 0 | 0 | 6.7 | 0 |
| | Polyol (I) | 500 | 4 | 0 | 0 | 0 | 58.5 | 0 |
| | Polyol (J) | 500 | 4 | 0 | 0 | 0 | 34.8 | 0 |
| | Total (polymer) | | | 100 | 100 | 100 | 100 | 100 |
| Filler | Talc | | | 42.6 | 33.3 | 33.3 | 0 | 0 |
| | Calcium carbonate | | | 0 | 33 | 33 | 0 | 42.6 |
| | Silica | | | 0 | 0 | 0 | 12.1 | 0 |
| | Curing catalyst | | | 0.29 | 0.33 | 0.33 | 0.22 | 0.29 |
| | Total (second liquid) | | | 142.9 | 166.6 | 166.6 | 112.3 | 142.9 |
| | Low-molecular-weight polyol/high-molecular-weight polyol (II) mass ratio | | | 0.75 | 0.62 | 0.50 | — | 0.14 |
| | Low-molecular-weight polyol/high-molecular-weight polyol (II) OH molar ratio | | | 10.3 | 10.6 | 8.5 | — | 2.4 |
| | Talc content (%) | | | 29.8 | 20 | 20 | 0 | 0 |
| | Filler/polymer mass ratio | | | 0.43 | 0.66 | 0.66 | 0.12 | 0.43 |

[5] Evaluation of Adhesive

The first liquid ((A) to (I)) was matched with the second liquid ((V) to (Z)) as shown in Table 3 to obtain two-part urethane adhesive compositions of Examples 1 to 3 and Comparative Examples 1 to 6. The adhesive properties of the adhesive compositions were evaluated by the following method.

TABLE 3

| | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| First liquid | (A) | (B) | (C) | (D) | (E) | (F) | (G) | (H) | (I) |
| Second liquid | (V) | (V) | (W) | (V) | (V) | (X) | (Y) | (Y) | (Z) |
| First liquid:second liquid mass ratio | 150:100 | 150:100 | 100:100 | 150:100 | 150:100 | 100:100 | 400:100 | 400:100 | 100:100 |
| NCO/OH molar ratio | 1.21 | 1.21 | 1.24 | 1.21 | 1.21 | 1.04 | 1.21 | 1.21 | 1.37 |
| Low-molecular-weight polyol/high-molecular-weight polyol (I, II) OH molar ratio | 6.25 | 6.25 | 6.34 | 6.25 | 6.25 | 2.25 | 3.94 | 3.94 | 1.6 |
| Filler/polymer mass ratio | 0.5 | 0.55 | 0.63 | 0.55 | 0.64 | 0.28 | 0.22 | 0.15 | 0.38 |
| Talc (%) | 20.9 | 20.9 | 20 | 11.9 | 26.6 | 10 | 16 | 10.2 | 27.5 |
| Calcium carbonate (%) | 9 | 11.7 | 16.4 | 20.7 | 18.6 | 10 | 0 | 0 | 14.9 |
| Zeolite (%) | 10.2 | 7.5 | 6 | 7.5 | 1.8 | 10 | 0 | 8 | 0 |
| Foaming | Good | Good | Good | Good | Bad | Good | Bad | Good | Fair |
| Adhesive strength (ED steel sheet) | 17.7/C Good | 17.2/C Good | 21.0/C Good | 18.2/C Good | 17.5/C Good | 16.5/C Good | 20.0/C Good | 19.4/C Good | 3.5/C Bad |
| Adhesive strength (SMC sheet) | 6.2/B Good | 6.3/B Good | 6.0/B Good | 6.5/B Good | 6.1/B Good | 5.4/A Good | 5.1/A Good | 4.8/A Fair | 2.5/A Bad |
| Water resistance | 5.7/B Good | 5.5/B Good | 5.4/B Good | 4.5/A Fair | 5.3/B Good | 4.0/A Fair | 3.2/A Bad | 3.8/A Bad | 2.0/A Bad |
| Moisture resistance | 5.8/B Good | 5.7/B Good | 5.8/B Good | 5.1/A Good | 5.4/B Good | 4.2/A Fair | 3.8/A Bad | 3.5/A Bad | 1.8/A Bad |

TABLE 3-continued

|  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Heat resistance | 6.5/B Good | 6.4/B Good | 6.4/B Good | 6.7/B Good | 6.3/B Good | 6.5/B Good | 4.5/A Fair | 5.1/A Good | 3.1/A Bad |

(1) Adhesive Strength (ED Steel Sheet)

A specimen in accordance with JIS K6850 was prepared using an adhesive prepared by homogenously mixing the first liquid and the second liquid in a ratio shown in Table 3 and an electrodeposited steel sheet (ED steel sheet) (length: 25 mm, width: 100 mm, thickness: 1.6 mm).

The specimen was prepared by applying the adhesive to the surface of two ED steel sheets, bonding the ED steel sheets so that the overlapping area had a length of 25 mm and a width of 12.5 mm, and curing the adhesive at 25° C. for 72 hours. The thickness of the adhesive layer was adjusted to 0.25 mm using glass beads.

The tensile shear strength of the adhesive area of so prepared specimen in line with the above was measured using a tensile tester ("Autograph AG5000B" manufactured by Shimadzu Corporation). The tensile shear strength was measured in accordance with the test for the tensile shear strength of adhesive of JIS K6850. The tensile shear strength was measured at a temperature of 23° C., a chuck distance of 110 nun, and a tensile rate of 5 mm/min.

Adhesive strength of ED steel sheet is evaluated as follows. A case where the tensile shear strength was 15 MPa or more was evaluated as "Good", a case where the tensile shear strength was 10 MPa or more and less than 15 MPa was evaluated as "Fair", and a case where the tensile shear strength was less than 10 MPa was evaluated as "Bad". Note that the adhesive layers of the specimens of the examples and comparative examples broke during the test. This is indicated by "C (cohesive failure)" in Table 3.

(2) Adhesive Strength (SMC Sheet)

A specimen in accordance with JIS K6850 was prepared using an adhesive prepared by homogenously mixing the first liquid and the second liquid in a ratio shown in Table 3 and an SMC sheet (length: 25 mm, width: 100 mm, thickness: 3 mm). The SMC sheet was prepared by degreasing an automotive fiber-reinforced resin test piece using methylene chloride.

The specimen was prepared by applying the adhesive to the surface of two SMC sheets, bonding the SMC sheets so that the overlapping area had a length of 25 mm and a width of 12.5 mm, and curing the adhesive at 25° C. for 24 hours. The thickness of the adhesive layer was adjusted to 0.5 mm using glass beads.

The tensile shear strength of the adhesive area of the specimen was measured using a tensile tester ("Autograph AG5000B" manufactured by Shimadzu Corporation). The tensile shear strength was measured in accordance with the test for tensile shear strength of adhesive of JIS K6850. The tensile shear strength was measured at a temperature of 23° C., a chuck distance of 110 mm, and a tensile rate of 5 mm/min.

Adhesive strength of SMC sheet is evaluated as follows. A case where the tensile shear strength was 5 MPa or more was evaluated as "Good", a case where the tensile shear strength was 4 MPa or more and less than 5 MPa was evaluated as "Fair", and a case where the tensile shear strength was less than 4 MPa was evaluated as "Bad". A case where the specimen broke at the interface between the adhesive layer and the SMC sheet is indicated by "A (interfacial fracture)", a case where the SMC sheet broke is indicated by "B (material fracture)", and a case where the adhesive layer broke is indicated by "C (cohesive failure)". A (interfacial fracture) indicate low adhesive strength.

(3) Water Resistance of Adhesive Layer

The specimen prepared using the SMC sheet was immersed in hot water (40° C.) for 20 days. After allowing the specimen to cool to room temperature (20° C.), the tensile shear strength of the specimen was measured. Water resistance of adhesive layer is evaluated as follows. A case where the tensile shear strength was 5 MPa or more was evaluated as "Good", a case where the tensile shear strength was 4 MPa or more and less than 5 MPa was evaluated as "Fair", and a case where the tensile shear strength was less than 4 MPa was evaluated as "Bad". The fracture of the specimen is indicated by "A (interfacial fracture)", "B (material fracture)", or "C (cohesive failure)" in the same manner as adhesive strength (SMC sheet).

(4) Moisture Resistance of Adhesive Layer

The specimen prepared using the SMC sheet was allowed to stand at a temperature of 50° C. and a relative humidity of 95% for 20 days. After allowing the specimen to cool to room temperature (20° C.), the tensile shear strength of the specimen was measured. Moisture resistance of adhesive layer is evaluated as follows. A case where the tensile shear strength was 5 MPa or more was evaluated as "Good", a case where the tensile shear strength was 4 MPa or more and less than 5 MPa was evaluated as "Fair", and a case where the tensile shear strength was less than 4 MPa was evaluated as "Bad". The fracture of the specimen is indicated by "A (interfacial fracture)", "B (material fracture)", or "C (cohesive failure)" in the same manner as adhesive strength (SMC sheet).

(5) Heat Resistance of Adhesive Layer

The specimen prepared using the SMC sheet was allowed to stand at 80° C. for 20 days. After allowing the specimen to cool to room temperature (20° C.), the tensile shear strength of the specimen was measured. Heat resistance of adhesive layer is evaluated as follows. A case where the tensile shear strength was 5 MPa or more was evaluated as "Good", a case where the tensile shear strength was 4 MPa or more and less than 5 MPa was evaluated as "Fair", and a case where the tensile shear strength was less than 4 MPa was evaluated as "Bad".

(6) Foaming

The specimen prepared using the ED steel sheet was allowed to stand at a temperature of 30° C. and a relative humidity of 80%, and subjected to strength measurement. The fracture surface was observed to evaluate the foaming state. A case where foaming was not observed on the fracture surface was evaluated as "Good", a case where foaming was observed to only a small extent was evaluated as "Fair", and a case where foaming was observed in fifty areas or more was evaluated as "Bad".

[Evaluation Results]

The adhesive compositions of Examples 1 to 3 showed excellent results for foaming, adhesive strength (ED steel sheet and SMC sheet), water resistance, moisture resistance, and heat resistance of adhesive layer. Since the adhesive composition of Comparative Example 1 was produced using the first liquid (D) that did not contain talc and had a calcium carbonate content of more than 40 parts by mass, the adhesive composition of Comparative Example 1 exhibited poor water resistance. The adhesive composition of Comparative Example 2 exhibited excellent adhesive properties, but foamed since the zeolite content in the first liquid was less than 10 parts by mass.

The adhesive composition of Comparative Example 3 exhibited insufficient water resistance and moisture resistance, since the OH molar ratio of low-molecular-weight polyol/high-molecular-weight polyol was less than four. The adhesive composition of Comparative Example 4 foamed since the zeolite content in the first liquid was less than 10 parts by mass. The adhesive composition of Comparative Example 4 exhibited poor water resistance and moisture resistance and insufficient heat resistance, since the OH molar ratio of low-molecular-weight polyol/high-molecular-weight polyol was less than four.

The adhesive composition of Comparative Example 5 exhibited insufficient adhesive strength (SMC sheet) and poor water resistance and moisture resistance, since the OH molar ratio of low-molecular-weight polyol/high-molecular-weight polyol was less than four. The adhesive composition of Comparative Example 6 foamed to some extent, since the zeolite content in the first liquid was less than 10 parts by mass. The adhesive composition of Comparative Example 6 exhibited poor adhesive strength (ED steel sheet and SMC sheet), water resistance, moisture resistance, and heat resistance, since the OH molar ratio of low-molecular-weight polyol/high-molecular-weight polyol was less than four.

Industrial Applicability

The urethane adhesive composition according to the present invention may be used as an adhesive for resin materials and metal materials more specifically, FRP materials such as fiber glass reinforced plastics (FRP) and carbon fiber reinforced plastics (CFRP). In particular, the urethane adhesive composition according to the present invention may be suitably used as an adhesive for sheet molding compound (SMC) FRP materials.

The invention claimed is:

1. A urethane adhesive composition comprising a first liquid that contains a prepolymer obtained by reacting a polyisocyanate and a polyol, and a second liquid that contains a polyol and a catalyst, the first liquid containing a prepolymer obtained by reacting a polyisocyanate and a high-molecular-weight polyol (I) having a number average molecular weight of 1000 or more, and at least one filler selected from talc and calcium carbonate, and containing 20 parts by mass or more of talc, 0 to 40 parts by mass of calcium carbonate, and 10 parts by mass or more of zeolite based on 100 parts by mass of the polyisocyanate, the high-molecular-weight polyol (I), and the prepolymer in total; the second liquid containing a high-molecular-weight polyol (II) having a number average molecular weight of 1000 or more, and a low-molecular-weight polyol having a number average molecular weight of less than 1000; and the ratio of the number of moles of hydroxyl groups derived from the low-molecular-weight polyol to the total number of moles of hydroxyl groups derived from the high-molecular-weight polyol (I) and the high-molecular-weight polyol (II) being from 6 to 7.

2. The urethane adhesive composition according to claim 1, wherein the prepolymer is obtained by reacting the high-molecular-weight polyol (I) with at least one polyisocyanate selected from polymeric MDI and modified MDI.

* * * * *